United States Patent [19]

Agrawal et al.

[11] Patent Number: 4,800,488

[45] Date of Patent: Jan. 24, 1989

[54] METHOD OF PROPAGATING RESOURCE INFORMATION IN A COMPUTER NETWORK

[75] Inventors: Rakesh Agrawal, Chatham; Ahmed K. Ezzat, New Providence, both of N.J.

[73] Assignee: American Telephone and Telegraph Company, AT&T Bell Laboratories, Murray Hill, N.J.

[21] Appl. No.: 796,864

[22] Filed: Nov. 12, 1985

[51] Int. Cl.$^4$ ............................................. G06F 15/16
[52] U.S. Cl. ........................... 364/200; 340/825.06
[58] Field of Search ... 364/200 MS File, 900 MS File; 340/825.51, 825.52, 825.5, 825.06, 825.08, 825.07

[56] References Cited

U.S. PATENT DOCUMENTS

| | | | |
|---|---|---|---|
| 3,771,137 | 11/1973 | Barner et al. | 364/200 |
| 4,402,046 | 8/1983 | Cox et al. | 364/200 |
| 4,423,414 | 12/1983 | Bryant et al. | 340/825.07 |
| 4,430,699 | 2/1984 | Segarra et al. | 364/200 |
| 4,477,882 | 10/1984 | Schumacher et al. | 364/900 |
| 4,480,304 | 10/1984 | Carr et al. | 364/200 |
| 4,562,535 | 12/1985 | Vincent et al. | 364/200 |
| 4,604,690 | 8/1986 | Crabtree et al. | 364/200 |
| 4,622,633 | 11/1986 | Ceccon et al. | 364/200 |
| 4,630,224 | 12/1986 | Sollman | 364/550 |
| 4,644,470 | 2/1987 | Feigenbaum et al. | 364/200 |
| 4,648,061 | 3/1987 | Foster et al. | 364/900 |

OTHER PUBLICATIONS

Marsicek Rh et al., "Distributed Data Processing System", IBM Technical Disclosure Bulletin, vol. 23, No. 5, Oct. 1985, pp. 1805-1810.
"Coordinating Operations of Plural Data Processors", Research Disclosure, Kenneth Mason Publications Ltd., England, Aug. 1985, No. 256, 25647.
D. B. Terry, "An Analysis of Naming Conventions for Distributed Computer Systems", *ACM*, 1984, pp. 218-224.
I. Gertner, "Initializing Replicated Name Servers in a Wide Area Network", *IEEE*, 1983, pp. 90-94.
M. Solomon et al., "The CSNET Name Server", (North-Holland), 1982, pp. 161-172.
D. C. Oppen et al., "The Clearinghouse: A Decentralized Agent for Locating Named Objects in a Distributed Environment", *ACM Transactions on Office Information Systems*, vol. 1, No. 3, (Jul. 1983), pp. 230-253.
B. Walker et al., "The LOCUS Distributed Operating System", *ACM* 1983, pp. 49-70.

Primary Examiner—Emanuel S. Kemeny
Assistant Examiner—David L. Clark
Attorney, Agent, or Firm—Jerry W. Herndon

[57] ABSTRACT

A method of propagating resource information among computers of a computer network in a fully distributed (or decentralized) fashion. A solicit message from a client one of the computers is transmitted to one or more prescribed server ones of the computers each time the client computer is made operative in the newtork. In response to the solicit message, each of the prescribed server computers determines if it is available as a resource to the client computer. The server then transmits a positive response message or a negative response message to the client computer if the server computer is available or unavailable, respectively.

In addition, when a server computer becomes available as a resource to one or more client computers, it transmits an advertisement message to the prospective client or clients.

17 Claims, 8 Drawing Sheets

CLIENT DATABASE

SERVER DATABASE

ADVERTISE

CONNECT

REMOTE EXECUTION REQUEST

METHOD OF PROPAGATING RESOURCE INFORMATION IN A COMPUTER NETWORK

TECHNICAL FIELD

The invention relates to computer networks in general and, in particular, to a process of distributing resource information to each network computer to form a distributed database for enabling the sharing of computer resources among the individual computers of such networks for distributed processing and the like.

BACKGROUND OF THE INVENTION

Much effort is presently focused toward providing distributed processing in computer networks. Distributed processing provides improved efficiency in networks by balancing loads between computers that are congested and those which have spare capacity. Users might, for example, offload particularly time consuming tasks, such as text formatting or floating point calculations, from their home computers to computers specially adapted for such tasks.

A method of performing remote process execution in a network is fully described in our copending U.S. patent application Ser. No. 796,863, entitled "Method of Distributed Processing in a Computer Nework." The disclosure of the application is incorporated in its entirety herein.

In a network in which resource sharing is allowed, there usually is some notion at each computer of which other network computers may act as resources for this computer.

Some systems provide a centralized resource name serving service at a single computer in the network. A computer transmits a query to the single computer to find out with which other computers it may share resources. If the single computer becomes faulty, network resource sharing and name serving is out of business. Another disadvantage of this centralized scheme is that an additional reference is required to the central computer before further processing can be continued. For these and other reasons, some networks use a distributed name serving function. The LOCUS system, described by G. Popek et al in "A Network Transparent High Reliability Distributed System", *Proceedings of ACM-SIGOPS 8th Symposium on Operating Systems Principles,* December 1981, pages 169-177, is an example of a virtual centralized name server. It conditions a network of computers to simulate a single virtual computer. This technique undesirably sacrifices much of the autonomy of having individual network computers.

Another centralized name server is disclosed by M. Solomon et al in "The CSNET Name Server", North-Holland Publishing Company; Computer Networks 6 (1982); pages 161-172. However, this system mitigates some of the problems of a centralized server by cacheing some of the server information at the individual computers as the information is received.

"The Clearinghouse: A Decentralized Agent for Locating Named Objects in a Distributed Environment", *ACM Transactions on Office Information Systems,* Vol. 1, No. 3, July 1983, discloses a distributed system. I. Gertner and R. Lindenberg describe another partially distributed database name server in a ring topology network in their article, "Initializing Replicated Name Servers in a Wide Area Network".

The distributed name servers mentioned above each incorporate extremely complicated algorithms to update the individual databases to changes in the network. Problems that must be addressed in some way include what to do when a computer is added to the network, how to insure consistency in parts of the distributed database that are replicated, how to know that a server has become inoperative, how to inform the clients of this situation, what to do when a server comes back on-line, etc.

U.S. Pat. No. 4,423,414, issued to D. M. Bryant et al on Dec. 27, 1983, attempts to solve some of the above problems by using a broadcast scheme in a network. A prospective client process wishing to execute a procedure remotely broadcasts a message identifying the procedure to the network. Computers recognizing the procedure respond. The first to respond is selected.

SUMMARY OF THE INVENTION

We overcome the limitations of the prior art and solve many of the above-mentioned problems in a simple, but elegant method of propagating resource information among computers of the computer network. A solicit message from the client computer is transmitted to one or more prescribed server ones of the computers each time the client computer is made operative in the network. In response to the solicit message, each of the prescribed server computers determines if the solicited resource at the server computer is available to the client computer. The server then transmits a positive response message or a negative response message to the client computer if the solicited resource at the server computer is available or unavailable, respectively.

In addition, when a server computer resource becomes available to one or more client computers, the server computer transmits an advertisement message to the prospective client or clients.

A computer may withdraw the availability of a resource to one or more of its prospective clients. It does this by issuing an unadvertise message to the appropriate client computers. The above summarized method, because it results in a distributed resource name server and because it allows temporary inconsistencies to exist between resource data at different computers, is reliable and tolerant to individual computer failures. In the preferred and disclosed embodiment, the resource that is available or unavailable is in fact the CPU of the computer itself. Thus, a computer may be available or unavailable to another computer for remote process execution, for example. However, the invention is not so limited. The resource can be anything, such as devices (printers, etc.), files, etc.

Each computer in the network maintains a server database and a client database. The server database contains an entry for each network computer that may at times act as a resource for this computer. An ENABLE flag in each entry indicates whether or not the prospective server is in fact enabled as a server for this computer at the present time. An ADVERTISED flag in each entry of this database indicates whether or not the prospective server computer has advertised itself to this computer as being available as a resource. Similarly, a client database contains entries for each network computer for which this computer may at times act as a server. An ENABLE flag in each client database entry indicates whether or not the associated prospective client is in fact enabled to be a client at the present time. An ADVERTISED flag in each entry indicates whether or not this computer has advertised itself to the prospective client as being available as a resource.

The following is a typical way for a computer to become a compute server. The computer sends an advertisement message to all enabled network computers that are listed in its client database. Optionally, the computer may advertise to a selected subset of the enabled client entries. All the computers that receive the advertisement message register the availability of the compute server in the appropriate server entry in the local server database. A client computer may be inoperative or off-line when the server makes the advertisement. The advertising computer sets its ADVERTISED flag in its client database regardless of the state of the client computer. To avoid the problem of inconsistent databases between server and client, a computer automatically sends a solicitation messge, asking for availability status, to all enabled potential servers in its server database when it comes on-line in the network. A computer that is not currently available as a server returns a negative acknowledgement message in response to a solicitation message. Otherwise, it returns a positive acknowledgement.

A computer, on receiving an unadvertise message from a server, removes the server from its available servers list by resetting the appropriate ADVERTISED flag.

If a server fails after advertising itself, the failure is detected by a client when it tries to use the compute server as a resource. When this occurs, the client computer resets the appropriate ADVERTISED flag in its local server database. When the compute server returns to an on-line state, it readvertises itself.

Once a server has advertised to a client, the client may initiate tasks, such as remote process execution, at the server. This is accomplished by a connect message sent from the client to the server. Upon successful connection, a private communication path is established between the client and the server. This communication path is maintained until either the client issues a "disconnect" command or the server unadvertises itself to this client.

Communications between client and server are over one-way communication channels. A receive end of a channel at a computer is defined by a communication object called a receive descriptor. The receive descriptor points to a queue in which incoming messages are stored while awaiting processing. It is also linked to a process or group of processes which will interpret messages to that descriptor. A send end of a channel is defined by a communication object called a send descriptor. Before sending a message to a server, the client first establishes a receive end of a channel for receiving the response from the server. The identity of the channel, receive end, is included in the message to enable the server to create the corresponding send end of this channel.

DETAILED DESCRIPTION

In the disclosed and preferred embodiment of our invention, each network computer is controlled by a version of a UNIX (UNIX is a trademark of American Telephone and Telegraph, Incorporated) operating system, although this is not a limitation of the invention. UNIX operating systems may be obtained under license from American Telephone and Telegraph - Technologies, Incorporated.

Figure 1:
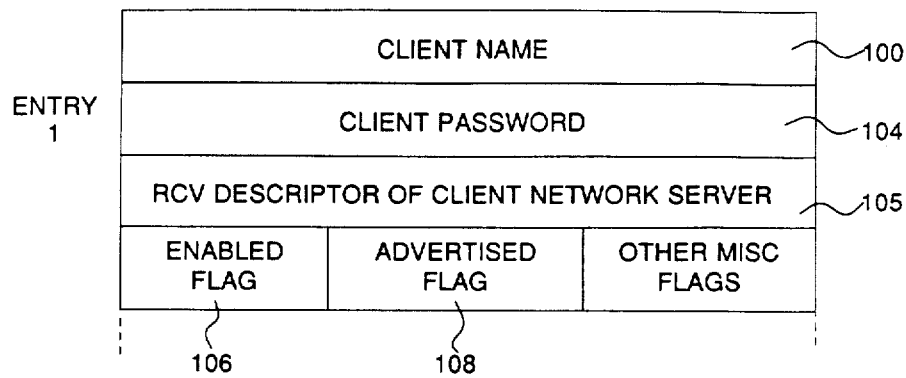
FIGS. 1 and 2 show illustrative formats of client and server databases that are maintained at each network computer. These databases at one computer identify which other computers for which the one computer may act as server and as a client, respectively.

Each computer maintains both a client computer database and a server computer database. The information contained in these databases is distributed across the network, in that a database at each computer contains only information relevant to that computer. An illustrative client database is shown in FIG. 1. A client database at a computer lists all other computers in the network for which this computer may, at various times, act as a compute server. However, an entry in the client database is not sufficient for this computer to be available as a server for the prospective client. In addition, the servier must have advertised itself as being available to the prospective client and the two computers must be "connected". The means of these terms will become apparent as this description continues.

An individual entry is maintained for each prospective client in the client database. As shown FIG. 1, an entry contains a client name 100, a password 104 for the client for authentication purposes, a receive descriptor 105 of a network server process at the prospective client and a number of flags such as 106 and 108. The client name is used for uniquely identifying a computer in the network. What we here call receive descriptor 105 is actually an address that is translatable into a receive descriptor. In general, a receive descriptor identifies a computer and a special file at the computer which is linked to a given process. Receive descriptor 105 identifies a communication channel to a network server process at the associated prospective server computer and may be viewed as semi-permanent information. It is always present to allow this computer to communicate with the prospective client computer.

The flags that are of interest here are an ENABLED flag 106 and an ADVERTISED flag 108. The ENABLED flag is set when this computer is enabled to act as a server for the network computer identified by the client network identification. By way of example, such enabling is done under control of the computer administrator. The ADVERTISED flag is set when this computer has advertised itself to the prospective client computer as a possible server. The remaining miscellaneous flags in the client database are not necessary for an understanding of the invention.

Figure 2:
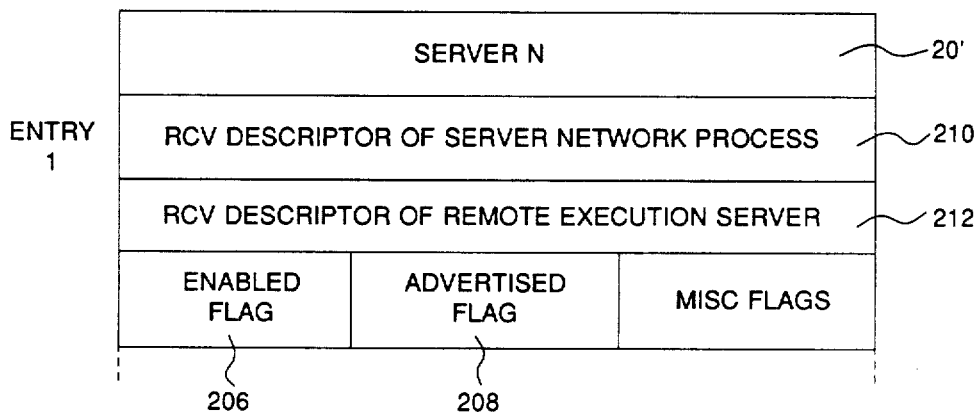

A server database is illustrated in FIG. 2. It is similar to the client database and lists all network computers that may operate as a compute server for this computer. An entry in the server database contains a common network name 200, such as EAGLE, of a prospective server computer, a receiver descriptor 210 of the network server process at the prospective server computer (similar to receive descriptor 105 in a client database) a word 212 for storing a receive descriptor of a remote execution process (when it is known) at the prospective server computer and ENABLED and ADVERTISED flags 206 and 208, respectively. The meanings of the flags are similar to that of the like-named flags in the client database. The ENABLE flag of a computer is set, under the control of the computer administrator, to indicate that the computer is active in this computer's client or server database.

By way of example, our disclosed embodiment runs on AT&T 3B2 computers interconnected with AT&T 3BNET, which is an Ethernet compatible 10 megabits/second local area network. Each computer runs a modified version of the UNIX System V operating system.

Figure 3:
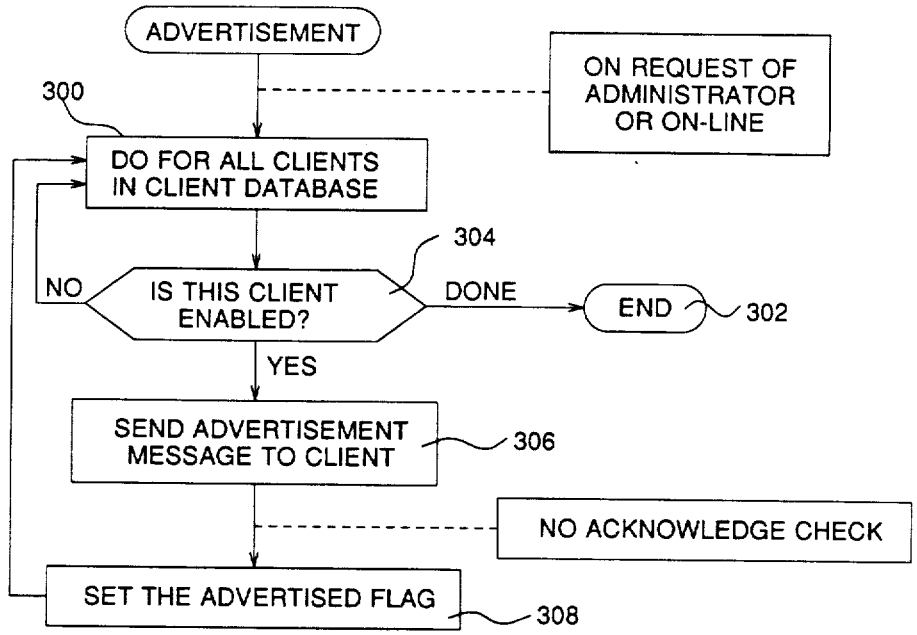
FIG. 3 shows a flowchart of a program by means of which a computer advertises itself to other computers as available as a server.
Figure 11:
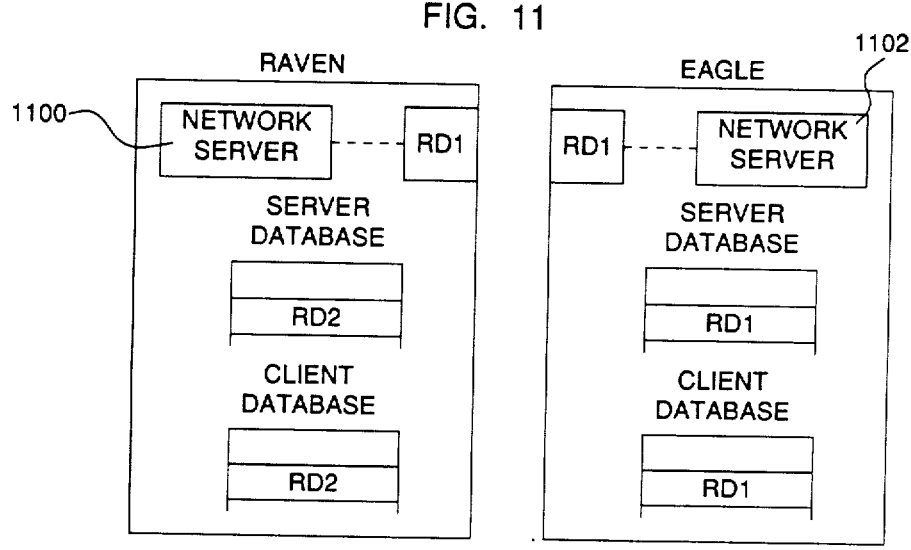
FIGS. 11 through 15 illustrate communication channel configurations between two network computers, a client and a server, for the various network communication protocols of our invention, including advertizing, connecting, soliciting and remote process execution.

FIG. 3 illustrates the program steps that are performed in our embodiment to advertise a computer as an available resource to the other network computers in its client database. However, before we describe FIG. 3, it is helpful to digress to FIG. 11. FIG. 11 shows two network computers, RAVEN and EAGLE. Both RAVEN and EAGLE contain network servers 1100 and 1102, respectively. A network server is a program that accepts messages from other network computers and acts on them in some reasonable way. A network server might, for example, be the initial contact at a computer for handling electronic mail. In our case, the network server is used, among other things, to receive messages from other computers, to establish communication channels between computers in response to advertisement messages and the like, to activate remote execution servers (programs which serve remote process execution requests) in response to remote execution requests and to establish channels for direct communication between a client computer and a remote execution server.

Every computer in the network has available to it a receive descriptor of every other network computer with which it may communicate. This receive descriptor is stored in both the client and server databases at 105 and 210, respectively. In FIG. 11 this receive descriptor corresponds rd1 at RAVEN and rd2 at EAGLE. Note that receive descriptors rd1 and rd2 are connected by a communication channel to the respective network servers 1100 and 1102 at RAVEN and EAGLE, respectively. If RAVEN wishes to send a message to EAGLE, it does so by retrieving the receive descriptor rd2 from an appropriate one of the client or server data databases. Similarly, EAGLE would communicate with RAVEN using rd1, obtained from its server or client database.

Figure 12:
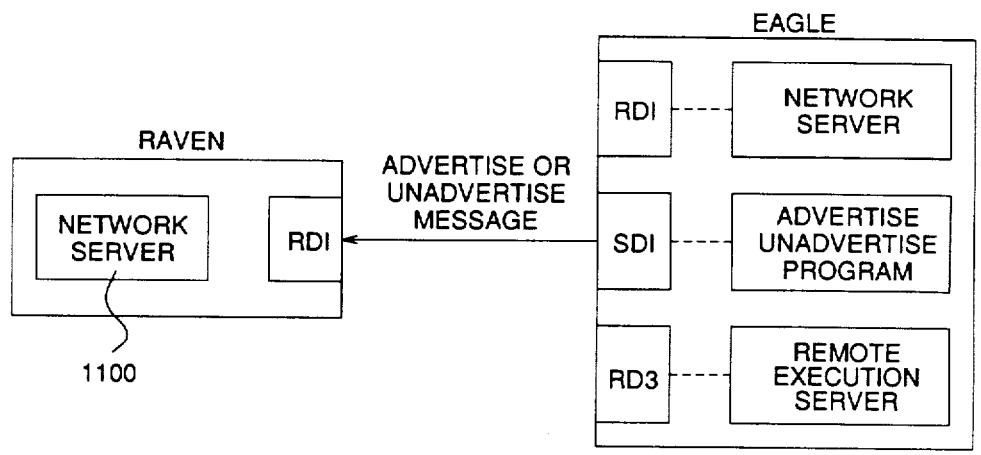

With reference to FIG. 3, it can now be appreciated how an advertisement message is communicated from a prospective server to prospective clients. The reader should also refer to FIG. 12 during this description. The ADVERTISE program of FIG. 3 is entered on request of a computer administrator, or automatically each time the computer (say EAGLE) is brought on-line in the network. Step 300 initializes the ADVERTISE program to loop throughout all entries in its client database. When all entries are processed the program exits at 302. For the client database entry presently being processed (say RAVEN), step 304 checks the ENABLED flag in the entry to determine if this computer is presently enabled as a server for this prospective client. Recall that the ENABLED flag is set or reset under control of the computer administrator. If the ENABLED flag is reset, this entry is ignored and the loop is repeated for the next entry in the database. If the flag is set, step 306 builds an advertise message, which includes the name of the advertising computer. Step 306 next opens a send descriptor sd1 at EAGLE and uses sd1 to transmit the advertise message to the network server 1100 at RAVEN. It uses the receive descriptor rd1 so that the advertise message is routed to RAVEN in the network. Step 308 sets the ADVERTISED flag in the EAGLE client database entry for RAVEN. Thus, as far as this prospective server (EAGLE) is concerned, it has advertised itself to this prospective client (RAVEN) as being available as a resource. These steps now repeat for the remaining entries in the client database (of EAGLE).

The ADVERTISED flag in the prospective client's server database is set in response to the advertisement message, as will be described below with respect to FIG. 4. Note that no return acknowledgement message is required or expected from the prospective client by the advertising computer in response to the advertisement message. In accordance with an aspect of the invention, no special precautions need be taken by the advertising computer to ensure that the prospective client's server database is properly updated. If the prospective client is off-line, the client computer's server database will be updated at a later time when it comes on-line by means of a solicitation message.

An advertisement may be made to a single computer in the network, if desired rather than to all enabled computers in the client database. In this case, the ADVERTISEMENT program of FIG. 3 is entered directly at step 304, with the prospective client to which the advertisement is to be made as an input parameter. This separate entry is not shown in FIG. 3 for simplicity.

Figure 4:
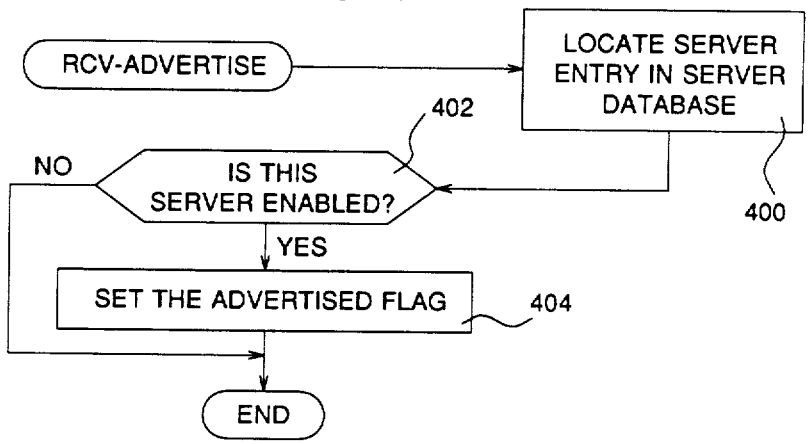
FIG. 4 shows a flowchart of a program that is executed in response to an advertise message from another computer.

The process steps executed at a prospective client computer in response to an advertisement message are shown in FIG. 4. At the prospective client (RAVEN), the advertisement message is received via rd1 and communicated to the network server 1100. Network server 1100 calls program RCVADVERTISE shown in FIG. 4. Step 400 uses the server name in the advertisement message to locate the appropriate entry in the computer's server database. If the entry cannot be found, the advertisement message is ignored. Step 402 checks that the ENABLE flag is set for this server. If the flag is not set, this computer is not interested in using the associated server and the RCVADVERTISE program ends.

If the ENABLE flag is set, when step 404 now sets the ADVERTISED flag in the entry to register the availability of the server.

Figure 5:
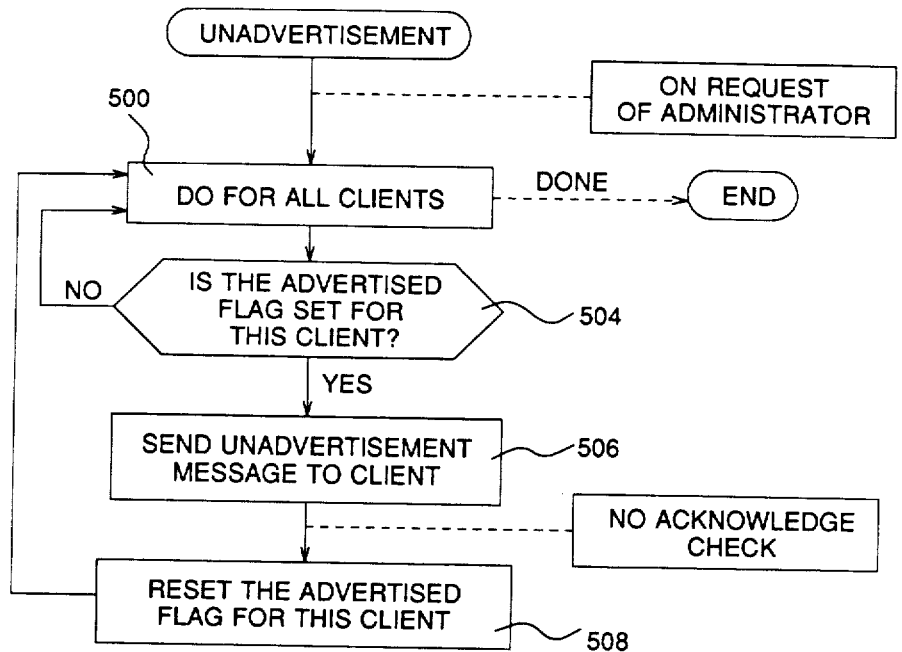
FIG. 5 shows a flowchart of a program by means of which a computer unadvertises itself to other computers as available as a server.

FIG. 5 shows illustrative steps of an UNADVERTISEMENT program. This program is executed at a server computer to make the computer unavailable as a server. In our illustrative embodiment, this is done in response to a command from a computer administrator. Step 500 initializes a loop so that all entries in the computer's client database are processed. When all the entires are processed, the loop exits at 502. With respect to the first entry found in the client database, step 504 determines if the ADVERTISED flag is set for the associated prospective client in the server's client database. If it is not set, this entry is ignored; processing continues with the next entry, if any. Otherwise, step 506 generates an unadvertisement message, including the computer's name, and transmits it to the client using the receive descriptor rd1 in the client database. The program does not expect or look for an acknowledgment that the client received the message. Finally, step 508 resets the ADVERTISED flag in this database entry to complete the process for this entry. The loop is now repeated to process remaining entries in the client database. If for any reason the above unadvertisement message is not received by the client computer, the situation will be remedied when, at a future time, the client computer issues a solicitation message or a remote process execution request to this computer. In the latter case, the request will fail at the client computer and, as a result, the ADVERTISED flag will then be reset at that computer.

As in the case of an advertisement message, it is possible to unadvertise to a single client computer by entering the UNADVERTISE program at step 504 with the client computer name as an input parameter.

Figure 6:
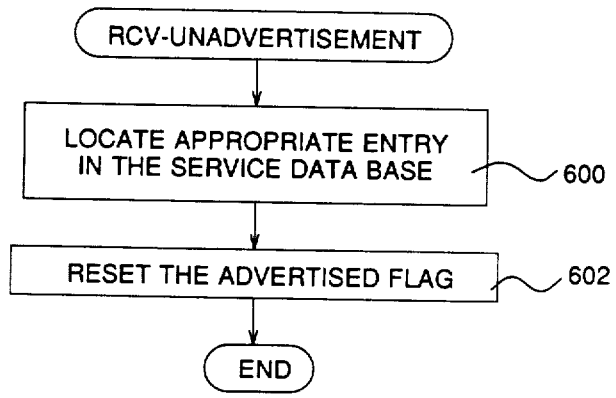
FIG. 6 shows a flowchart of a program that is executed in response to an unadvertise message from another computer.

FIG. 6 shows the steps that are executed at a computer in response to receipt of an unadvertisement message. Step 600 locates the appropriate entry in its server database, using the server name included in the unadvertisement message. The message is ignored, of course, if no entry is found in the database. Otherwise, the ADVERTISED flag is reset in the appropriate server database entry at step 602.

Figure 7:
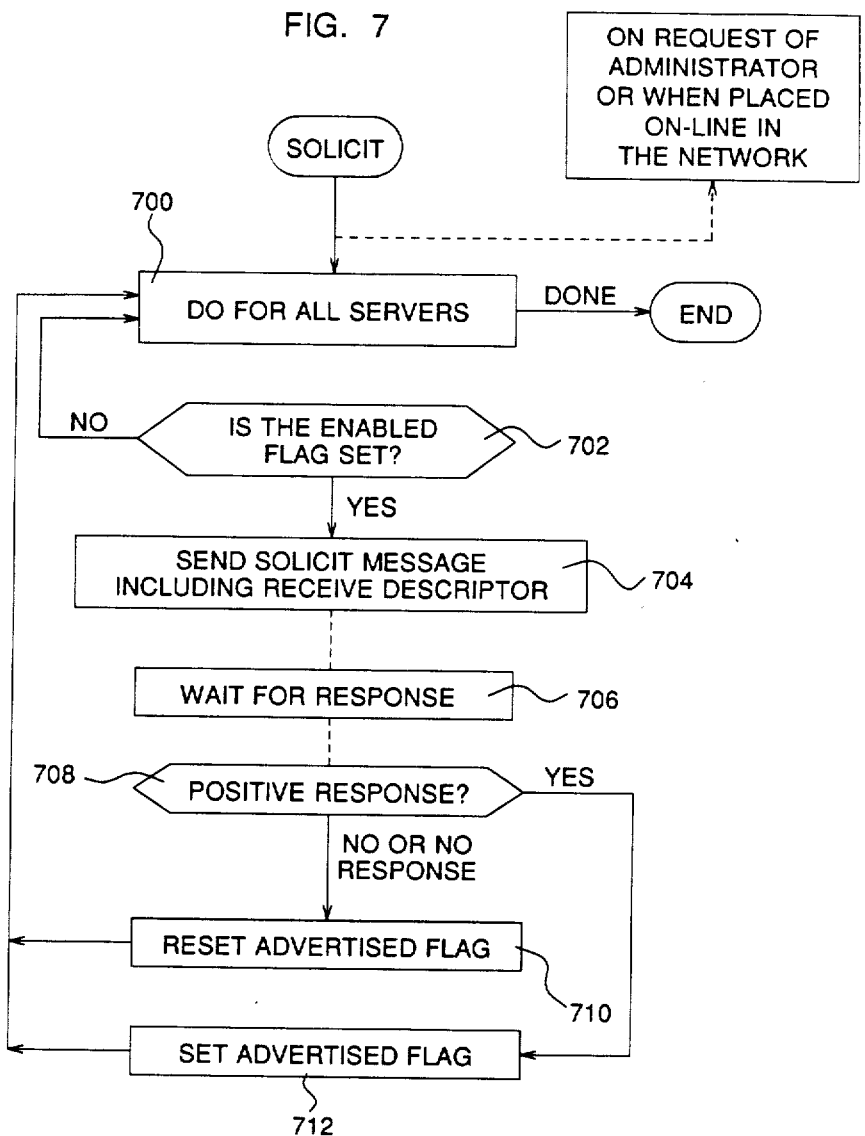
FIG. 7 shows a flowchart of a program that is executed by a computer to solicit updates to the advertise flags of this local server database.
Figure 13:
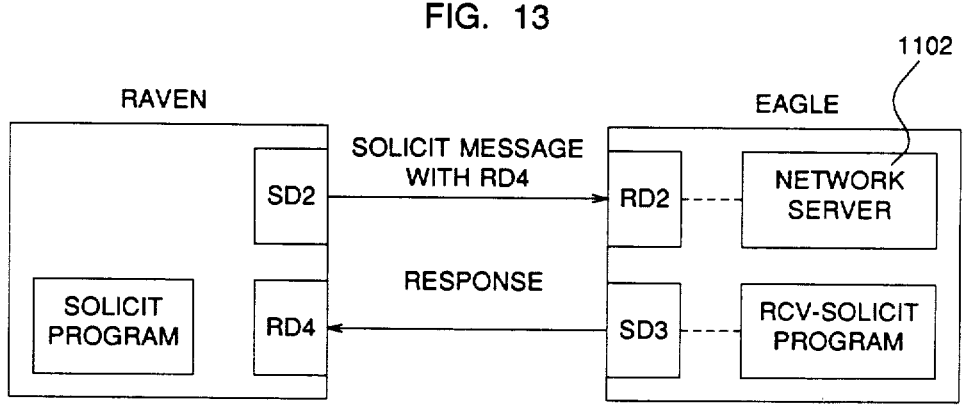

When a computer is brought on-line after being inoperative or unavailable, it is possible that its server database may be out-of-date. For example, while the computer was off-line, one or more other network computers may have issued advertise or unadvertise messages to this computer which, of course, were not received. The program of FIG. 7 issues a solicitation message to all of its prospective servers to update its server database. In this illustrative embodiment, the SOLICIT program is executed when the computer administrator. Step 700 initiates a loop to process all entries in this computer's server database. For the first entry, step 702 determines from the state of the ENABLED flag if the associated server computer is enabled as a server. Recall that whether or not a prospective server is enabled at any given time is a computer administrator function. If the prospective computer is not enabled, this entry is ignored and the loop proceeds with the next entry at step 700. Otherwise, step 704 builds a solicitation message for the prospective server. With reference to FIG. 13 (assuming that RAVEN is the computer building the solicit message), the program opens a receive descriptor rd4 to be used by the prospective server to return a response message to the solicit message. The solicitation message, including rd4, is sent to the prospective server (say EAGLE), using the receive descriptor rd4 from word 210 of the server database to address the network server at the prospective server computer. Step 706 waits for a prescribed time interval sufficient to receive the response message from the prospective server. Techniques for establishing such a wait mechanism are well known and vary from system to system. When response is received, or when the prescribed time interval expires, whichever occurs first, step 708 is executed. Step 708 determines the result of the solicit message. If the server computer does not respond or if it responds with a "no" acknowledgement (meaning that it is not available as a server to this computer), the associated ADVERTISED flag is reset by step 710. Otherwise, step 712 sets the ADVERTISED flag to register the server computer's availability. In either event, the loop is now continued to process the remaining server database entries, if any.

Figure 8:
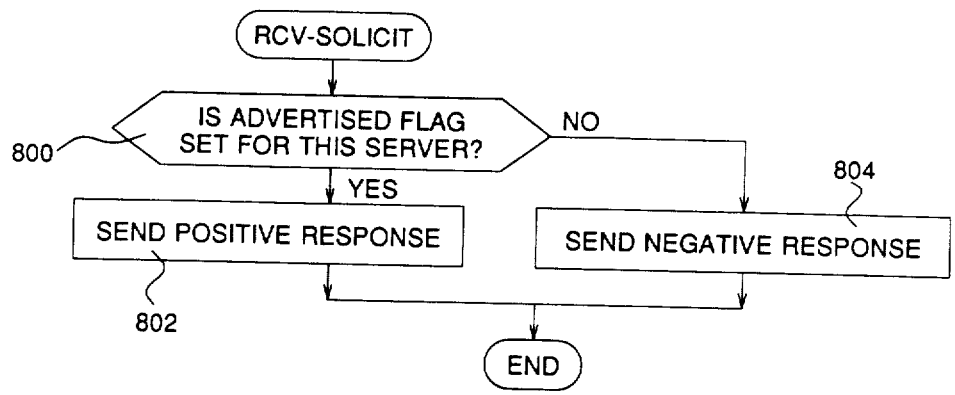
FIG. 8 shows an illustrative flowchart of a program executed at a computer in response to a solicit message from another computer.

The RCVSOLICIT program of FIG. 8 shows the steps executed at a computer in response to a solicit message from another computer. The response is simple. The name of the soliciting computer is obtained from the received message and the ADVERTISED flag in the appropriate entry of the client database is interrogated by step 800. If the flag is set, indicating that this computer is available as a server to the soliciting computer, step 802 builds and sends a positive response message to the computer. Otherwise, step 804 builds and transmits a negative response message. The response message is returned to RAVEN, in this case, by opening a send descriptor, say sd3, and sending the message to the receive descriptor rd4 received in the solicit message.

Figure 9:
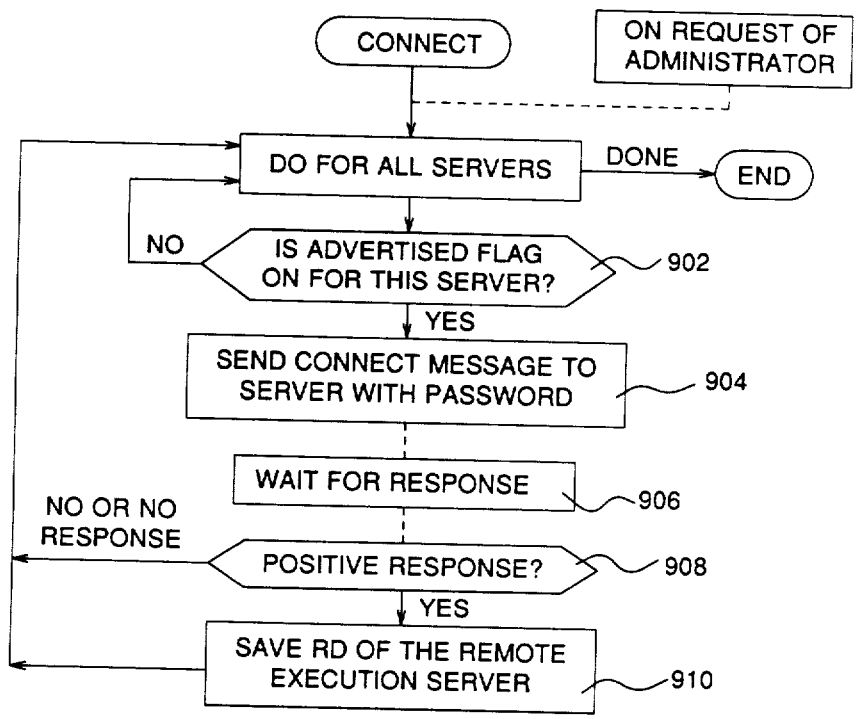
FIG. 9 shows an illustrative flowchart of a program executed at a computer in response to a connect command to establish communication channels between this computer and dispatcher server processes at prospective server computers.
Figure 14:
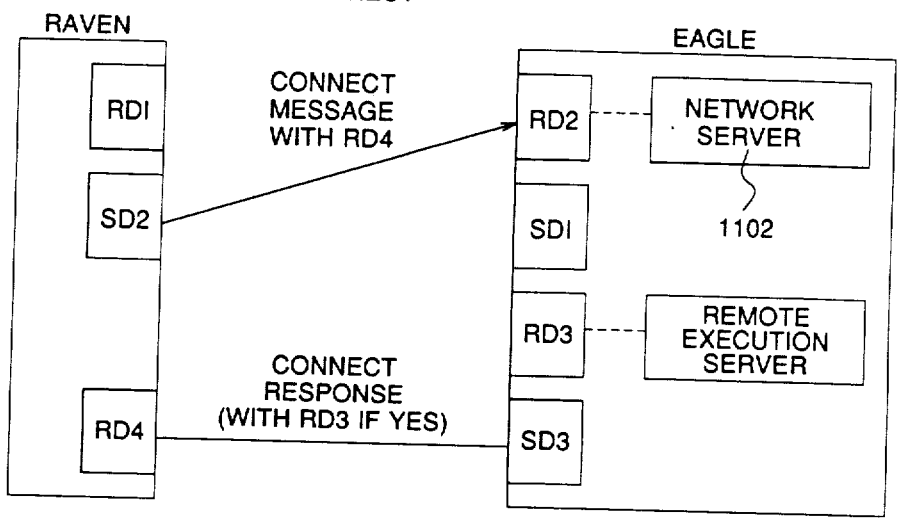

The CONNECT program of FIG. 9 is executed by a computer when requested by a computer administrator. CONNECT establishes a communication channel to a remote execution server for each network computer listed in the server database for which the ADVERTISED flag is set. This communication channel is used to transmit subsequent remote process execution requests to the computer. How this is accomplished is further illustrated in FIG. 14, assuming that RAVEN is the computer executing the CONNECT program and EAGLE is one of the network computers in RAVEN's server database. Step 900 of FIG. 9 initializes a loop to process all entries of RAVEN's server database. The ADVERTISED flag of the first computer in the database is interrogated by step 902. If the flag is not set, this entry is ignored and the next entry is processed. Assuming that the flag is set, however, and that the computer is EAGLE, step 904 opens a receive descriptor, say rd4, and builds and sends a connect message, including a password and rd4, to EAGLE. Referring to FIG. 14, the connect message is routed to send descriptor rd2, obtained from word 210 of the server database, to address the network server at EAGLE. Step 906 waits for a response from EAGLE in a conventional manner.

Figure 10:
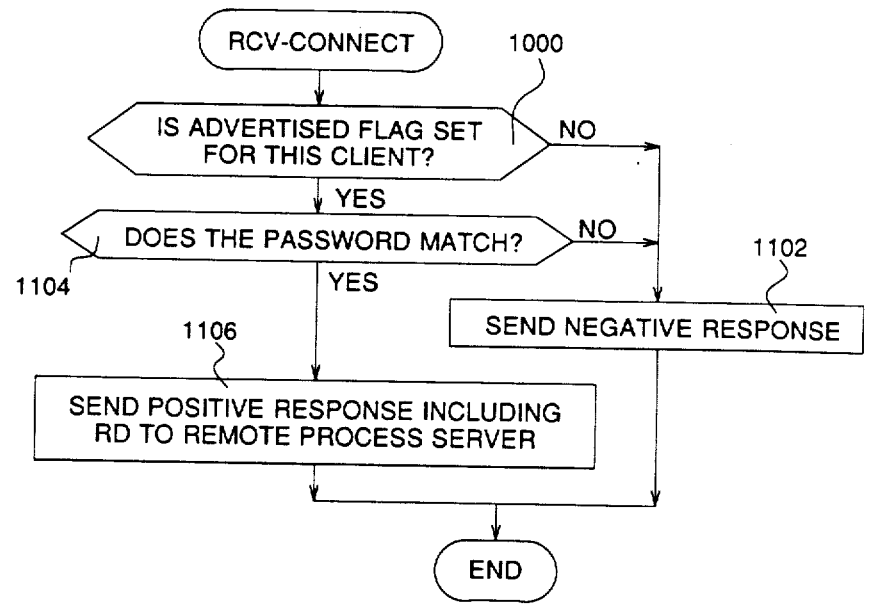
FIG. 10 shows an illustrative flowchart of a program executed in response to a connect message from a computer generated by the program of FIG. 9.

FIG. 10 shows the program steps executed at EAGLE in response to the connect message. Step 1000 interrogates the ADVERTISED flag 108 in the appropriate entry of its client database for RAVEN. If it is not set, indicating that EAGLE is not presently available as a server to RAVEN, step 1002 returns a negative response message. The response is sent using the receive descriptor rd4 included in the original connect message, as shown in FIG. 14. If EAGLE is available to server RAVEN, step 1004 compares the password contained in the message from RAVEN to that in word 102 of EAGLE's client database to verify that the connect message is not being received from an imposter. A negative response is returned by step 1002 if the passwords mismatch. Otherwise, step 1004 opens another receive descriptor, say rd3, and sends a positive response message, including rd3, to RAVEN via rd4. As shown in FIG. 14, receive descriptor rd3 provides a communication channel to a remote execution server at EAGLE.

Figure 15:
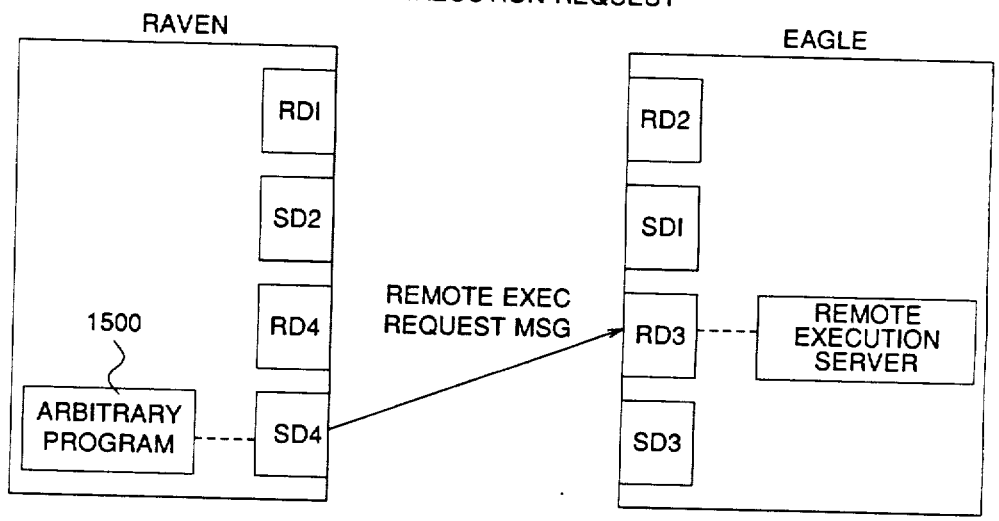

With reference again to the CONNECT program in FIG. 9, step 908 determines if the response from EAGLE is positive, negative or if no response is received after waiting for a prescribed time interval. If a negative or no response is received, this server (EAGLE) is ignored; processing continues with the next server database entry at step 900. If a positive response is received from RAVEN, step 910 saves receive descriptor rd3 in word 212 of RAVEN's server database entry for EAGLE. Processing then continues at step 900. At a later time, when RAVEN is requested by a user or process to send a remote execution request message to EAGLE, rd3 in RAVEN'S server database entry for EAGLE is used to communicate directly with the remote execution server 1104 at EAGLE. This is illustrated in FIG. 15, where some arbitrary process 1500 at RAVEN opens a send descriptor sd4 and transmits a remote process execution message, as taught in our above-mentioned copending application, to the remote execution server at EAGLE.

In view of the above teaching, a number of refinements may easily be added to our invention. For example, a computer may specify in an advertisement message the time during which it will be available as a server to a client. Time synchronization between a server and a client may be provided by advertising the time duration that a server will be available to a client. Thus, although the client's view of the absolute time that the server is available may be different from the server's view, both views of the absolute time relative to a local clock are consistent. At the end of the specified time period at the prospective server, a time-out process may send an unadvertise message to the client or clients.

It is understood that the above-described arrangement is merely illustrative of the application of the principles of the invention and that other arrangements may be devised by those skilled in the art without departing from the spirit and scope of the invention.

What is claimed is:

1. A method of propagating resource information among computers of a computer network, comprising the steps of
at each computer,
dynamically advertising the availability or unavailability of a resource at the computer to other computers of the network in response to the resource becoming available or unavailable, respectively, for use by the other computers,
soliciting the availability or unavailability of a resource at other computers of the network each time the computer is placed on-line in the network,
maintaining a database of the availability or unavailability of the resource at other computers of the network, and
verifying from the database that a resource at a specified computer is available from attempting to use the resource at the specified computer.

2. A method of propagating resource information among computers of a computer network, comprising the steps of
transmitting an advertisement message from a server one of the computers to one or more potential client computers when the server computer becomes available as a resource to the client computers, and
responsive to receipt of advertisement messages, updating a database at each potential client computer of the computers that are available to the potential client computer as a resource.

3. The method of claim 2 further comprising the steps of
transmitting a solicit message from a potential client one of the computers to one or more potential server ones of the computers when the client computer is made operative in the network, and
at each of the potential server computers, in response to receipt of the solicit message,
determining if the potential server computer is available as a resource to the client computer,
transmitting a positive response message or a negative response message to the client computer if the server computer is available or unavailable, respectively, and
updating the database at the potential client computer according to the response message.

4. The method of claim 2 or claim 3 further comprising the steps of
transmitting an unadvertisement message from a server one of the computers to one or more potential client computers when the server computer becomes unavailable as a resource to the client computers, and
updating the databases at the client computers responsive to the unadvertisement message.

5. The method of claim 4 wherein the steps of updating a database further comprises the steps of
maintaining a server database and a client database at each network computer, each client database having entries identifying each other network computer for which this computer may potentially act as a resource and each server database having entries identifying each other network computer which may potentially act as a resource for this computer.

6. The method of claim 5 wherein each entry of the server databases contains an ADVERTISED field, and wherein the method further comprises the steps of
setting the ADVERTISED field in a server database entry to a first prescribed state in response to an advertisement message from the associated computer.

7. The method of claim 5 wherein each entry of the server databases contains an ADVERTISED field, and wherein the method further comprises the step of
setting the ADVERTISED field in a server database entry to a first or second prescribed state in response to a positive or negative response message, respectively, from the associated computer after sending a solicit message to the associated chamber.

8. The method of claim 5 wherein each entry of the client databases contains an ADVERTISED field, and wherein the method further comprises the steps of
setting the ADVERTISED field in a client database entry to a first prescribed state in response to sending an advertisement message to the associated computer.

9. The method of claim 8 further comprising the steps of
setting the ADVERTISED field in a client database entry to a second prescribed state in response to sending an unadvertisement message to the associated computer.

10. The method of claim 5 wherein each entry of the server databases contains an ADVERTISED field, and wherein the method further comprises the steps of
setting the ADVERTISED field in a server database entry to the second prescribed state in response to receiving an unadvertisement message from an associated computer.

11. The method of claim 5 wherein each entry of the client databases contain an ENABLED field, and wherein the method further comprises the steps of
sending an advertisement message to a network computer only if the ENABLED flag in the associated client database entry is set to a first prescribed state.

12. The method of claim 5 wherein each entry of the server databases contains an ENABLED field, and wherein the method further comprises the steps of
setting the ADVERTISED field in a server database entry to a first prescribed state in response to a advertisement message only if the ENABLED field in the entry is set to a second prescribed state.

13. A method of propagating resource information among computers of a computer network, comprising the steps of
transmitting an advertisement message from a potential server one of the computers to one or more potential client computers when a prescribed resource at the server computer becomes available to the client computers, and
updating a database at each potential client computer of the server computer resources that are available to the potential client computer responsive to the advertisement message.

14. The method of claim 13 further comprising the steps of
transmitting a solicit message from a potential client one of the computers to one or more potential server ones of the computers when the client computer is made operative in the network, and
at each of the potential server computers, in response to receipt of the solicit message,
determining if a prescribed resource is available at the server computer to the client computer,
transmitting a positive response message or a negative response message to the client computer if the resource is available or unavailable, respectively, and
updating the database at the potential client computer according to the response message.

15. The method of claim 13 or claim 14 further comprising the steps of
transmitting an unadvertisement message from a potential server one of the computers to one or more potential client computers when a prescribed resource at the server computer becomes unavailable to the client computers, and
updating the database at each potential client computer responsive to the advertisement message.

16. The method of claim 15 wherein the steps of updating a database further comprises the steps of
maintaining a server database and a client database at each network computer, each client database having entries identifying each other network computer to which this computer may supply the prescribed resource and each server database having entries identifying each other network computer from which this computer may obtain the resource.

17. A method of propagating resource information among computers of a computer network, comprising the steps of
maintaining a server database and a client database at each network computer, each client database having entries identifying each other network computer for which this computer may act as a resource and each server database having entries identifying each other network computer which may act as a resource for this computer,
transmitting advertisement messages from server ones of the computers to client ones of the computers as the server computers become available in resources to the client computers,
in response to receipt of advertisement messages at each computer, marking the advertising computer as being available in the server databases of the computers receiving the advertisement messages,
transmitting unadvertisement messages from server ones of the computers to client ones of the computers as the server computers become unavailable as resources to the client computers,
in response to receipt of unadvertisement messages at each computer, removing the availability markings of the unadvertising computers in the server databases of the computers receiving the unadvertisement messages,
transmitting availability solicitation messages from ones of the computers to server computers as the soliciting computers are placed on-line in the network,
marking as being available in the server databases of the soliciting computers those computers that respond as being available to the solicitation messages, and
at each computer, determining the availability of a potential server from the server database of the computer before attempting to use the potential server as a resource.

* * * * *

UNITED STATES PATENT AND TRADEMARK OFFICE
CERTIFICATE OF CORRECTION

PATENT NO. : 4,800,488

DATED : January 24, 1989

INVENTOR(S) : Rakesh Agrawal and Ahmed Kamal Ezzat

It is certified that error appears in the above-identified patent and that said Letters Patent is hereby corrected as shown below:

In column 4, line 50, (Specification) "the servier must" should read --the server must". In column 6, line 61, "RCVADVERTISE" should read --RCV_ADVERTISE--; line 68, "RCVADVERTISE" should read --RCV_ADVERTISE--. In column 7, line 54, sentence missing after "computer" should read --is brought on-line or on request of the computer--. In column 8, line 2, "rd4" should read --rd2--; line 20, "RCVSOLICIT" should read --RCV_SOLICIT--.

In column 9, line 67, (Claims) "available from attempting" should read --available before attempting--. In column 10, lines 62-3, "chamber" should read --computer--.

Signed and Sealed this

Twenty-eighth Day of April, 1992

Attest:

HARRY F. MANBECK, JR.

*Attesting Officer*   *Commissioner of Patents and Trademarks*